(12) United States Patent
Ide (10) Patent No.: US 7,654,564 B2
(45) Date of Patent: Feb. 2, 2010

(54) PROTECTION DEVICE ACTIVATION CONTROLLER

(75) Inventor: Seiya Ide, Okazaki (JP)

(73) Assignee: Denso Corporation, Kariya (JP)

( * ) Notice: Subject to any disclaimer, the term of this patent is extended or adjusted under 35 U.S.C. 154(b) by 225 days.

(21) Appl. No.: 11/901,679

(22) Filed: Sep. 18, 2007

(65) Prior Publication Data

US 2008/0067794 A1 Mar. 20, 2008

(30) Foreign Application Priority Data

Sep. 19, 2006 (JP) ............................. 2006-252329

(51) Int. Cl.
*B60R 21/16* (2006.01)
*B60R 21/01* (2006.01)

(52) U.S. Cl. ..................... 280/735; 180/282; 180/274; 701/45

(58) Field of Classification Search ................ 280/735; 180/282, 274; 701/45
See application file for complete search history.

(56) References Cited

U.S. PATENT DOCUMENTS

| 5,083,276 | A | * | 1/1992 | Okano et al. ................. 701/46 |
| 5,904,723 | A | | 5/1999 | Kiribayashi et al. |
| 6,070,113 | A | * | 5/2000 | White et al. .................. 701/45 |
| 6,095,554 | A | * | 8/2000 | Foo et al. ..................... 280/735 |
| 6,935,654 | B2 | * | 8/2005 | Komaki et al. ............... 280/735 |
| 7,121,376 | B2 | | 10/2006 | Baumgartner et al. |
| 2004/0160045 | A1 | | 8/2004 | Miura |
| 2004/0204810 | A1 | | 10/2004 | Ide et al. |
| 2007/0173998 | A1 | * | 7/2007 | Furui ........................ 701/45 |

FOREIGN PATENT DOCUMENTS

JP 09-222437 8/1997

OTHER PUBLICATIONS

Office Action dated Mar. 10, 2008 in German Application No. 10 2007 044 212.4 with English translation thereof.

* cited by examiner

*Primary Examiner*—Paul N Dickson
*Assistant Examiner*—Keith Frisby
(74) *Attorney, Agent, or Firm*—Harness, Dickey & Pierce, PLC (57) ABSTRACT

An occupant protection device controller includes a main sensor, a safing sensor, a main control circuit, a sub control circuit, and a trigger signal output circuit. Whereas the main control circuit has a CPU, and the sub control circuit has no CPU. The main control circuit determines whether to output a main control signal based on both an output of the main sensor and an output of the safing sensor. The sub control circuit has a comparator and determines whether to output a sub control signal based on a comparison of the output of the main sensor with a threshold value. The trigger signal output circuit outputs a trigger signal for activating an occupant protection device upon receipt of both the main control signal and the sub control signal.

20 Claims, 5 Drawing Sheets

PROTECTION DEVICE ACTIVATION CONTROLLER

CROSS REFERENCE TO RELATED APPLICATION

This application is based on and incorporates herein by reference Japanese Patent Application No. 2006-252329 filed on Sep. 19, 2006.

FIELD OF THE INVENTION

The present invention relates to a controller for activating an occupant protection device such as an airbag in the event of collision.

BACKGROUND OF THE INVENTION

An activation controller has been proposed that activates an occupant protection device such as an airbag to protect an occupant from a collision. Such an activation controller is configured in a redundant manner to ensure a fail-safe operation.

Figure 7A:
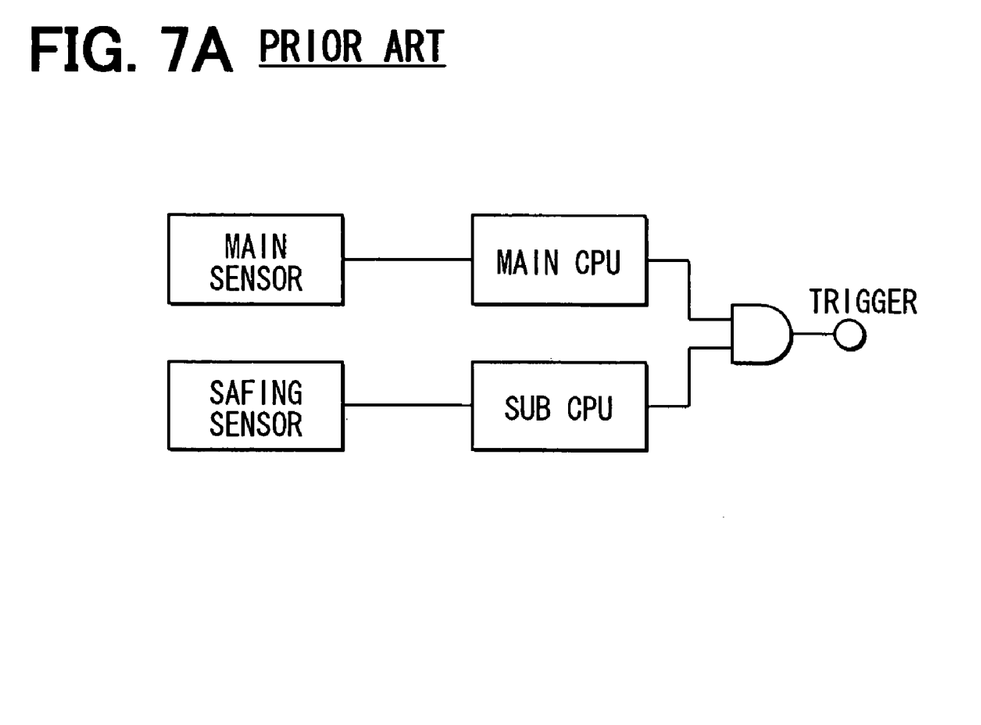
FIG. 7A is a block diagram of a conventional activation controller.

For example, as shown in FIG. 7A, a conventional activation controller includes two sensors, one of which is a main sensor and the other of which is a safing sensor (i.e., arming sensor). Each of the main sensor and the safing sensor is an acceleration sensor and detects deceleration (i.e., a negative acceleration) of a vehicle. The main sensor is connected to a main central processing unit (CPU). The main CPU determines whether a vehicle collision occurs based on an output signal of the main sensor. The safing sensor is connected to a sub CPU. The sub CPU determines whether a safing condition is met based on an output signal of the safing sensor. The activation controller allows an occupant protection device to be activated, only when the sub CPU determines that the safing condition is met. Thus, the activation controller is configured in a redundant manner to prevent false activation of the occupant protection device. However, a CPU is expensive, and the activation controller requires two CPUs. Therefore, the activation controller is costly.

Figure 7B:
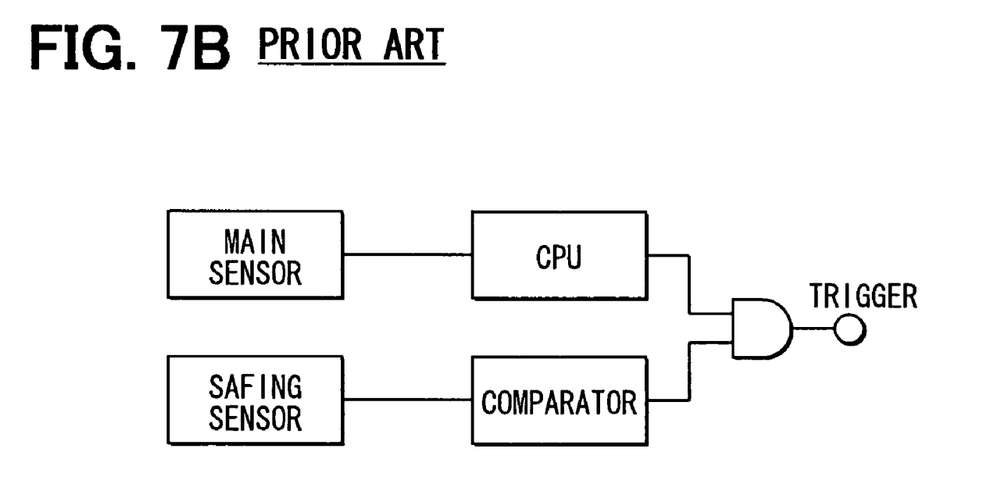
FIG. 7B is a block diagram of another conventional activation controller.

As disclosed, for example, in JP-A-H9-222437 and US 20040204810 corresponding to JP-A-2004-306920, an activation controller has been proposed that uses one CPU and is configured in a redundant manner. In the activation controller, as shown in FIG. 7B, a main sensor is connected to a CPU, and a safing sensor is connected to a simple integrated circuit (IC) having a comparator. The CPU determines whether a vehicle collision occurs based on an output signal of the main sensor. The comparator determines whether a safing condition is met by comparing an output signal of the safing sensor with a predetermined reference value. Specifically, the comparator determines that the safing condition is met, when the output signal of the safing sensor exceeds the reference value. A trigger signal for allowing the occupant protection device to be activated is outputted from the comparator, only when the safing condition is met. Thus, the activation controller prevents false activation of the occupant protection device by using one CPU.

The IC having the comparator is cheaper than a CPU due to its simple configuration. However, due to the simple configuration, the IC has very limited function. Therefore, although the safing condition needs to be customized according to vehicles, the IC cannot achieve the customization of the safing condition.

SUMMARY OF THE INVENTION

In view of the above-described problem, it is an object of the present invention to provide a cost-effective occupant protection device activation controller configured in a redundant manner to ensure reliable, fail-safe operation.

An occupant protection device activation controller includes a first sensor, a second sensor, a main control circuit, a sub control circuit, and a trigger signal output circuit. The first sensor detects a movement of the vehicle and outputs a first signal indicative of the movement of the vehicle. The second sensor detects the movement of the vehicle and outputs a second signal indicative of the movement of the vehicle. The main control circuit includes a central processing unit that has a first check circuit for determining based on the first signal whether a first condition is met and a second check circuit for determining based on the second signal whether a second condition is met. The main control circuit outputs a main control signal, when both the first condition and the second condition are met. The sub control circuit includes a comparator that compares the first signal with a threshold value. The sub control circuit outputs a sub control signal based on a result of the comparison. The trigger signal output circuit outputs a trigger signal for activating an occupant protection device, when receiving both the main control signal and the sub control signal.

The trigger signal is not outputted from the trigger signal output circuit, unless the sub control circuit outputs the sub control signal. In such an approach, the activation controller is configured in a redundant manner so that false activation of the occupant protection device can be prevented. Since the sub control circuit is required to only compare the first signal with the threshold value, the sub control circuit can be simplified and have no need to include a central processing unit. Therefore, the sub control circuit can be manufactured at low cost. Accordingly, the activation controller can be manufactured at low cost.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
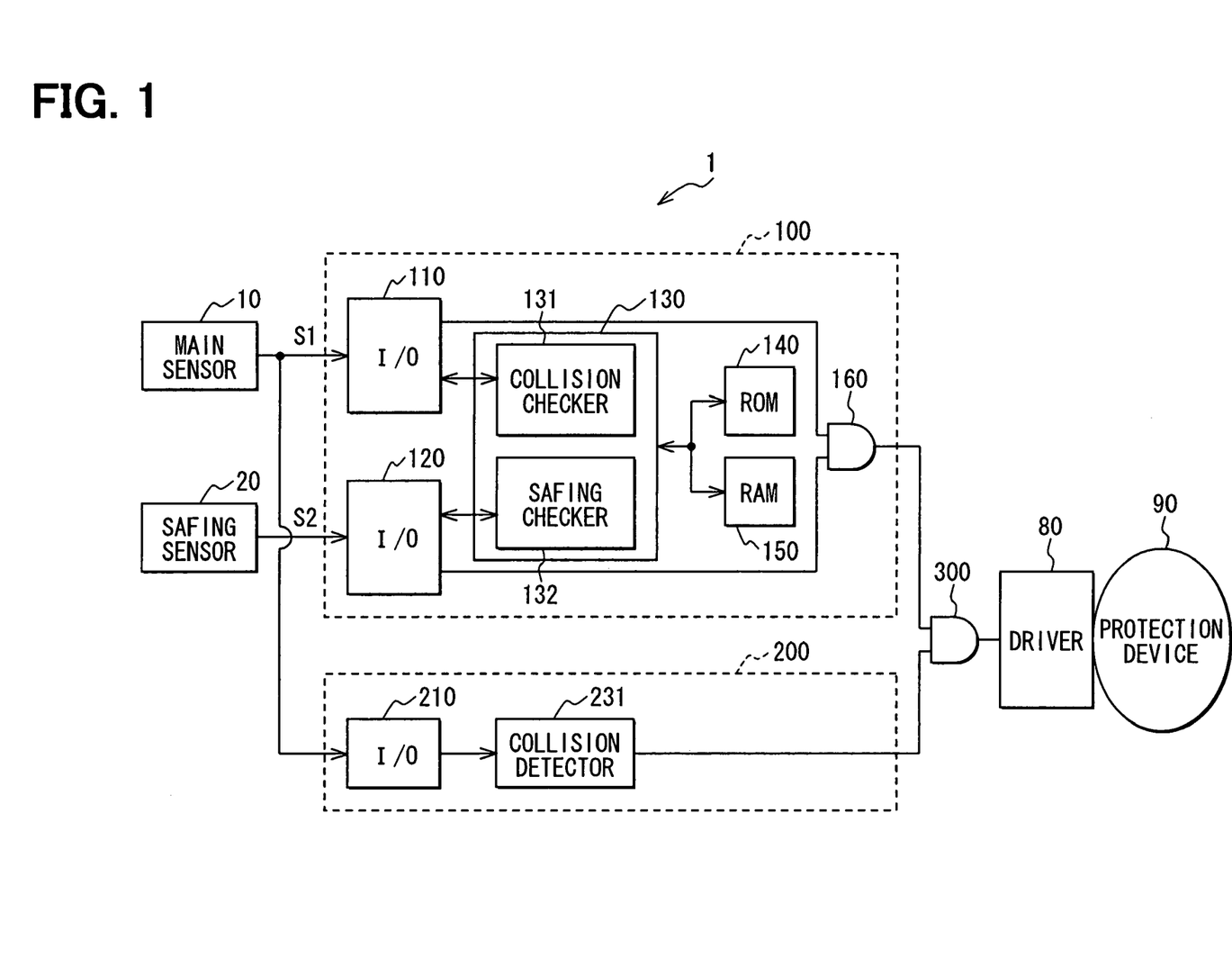
FIG. 1 is a block diagram of an activation controller according to an embodiment of the present invention.
Figure 2:
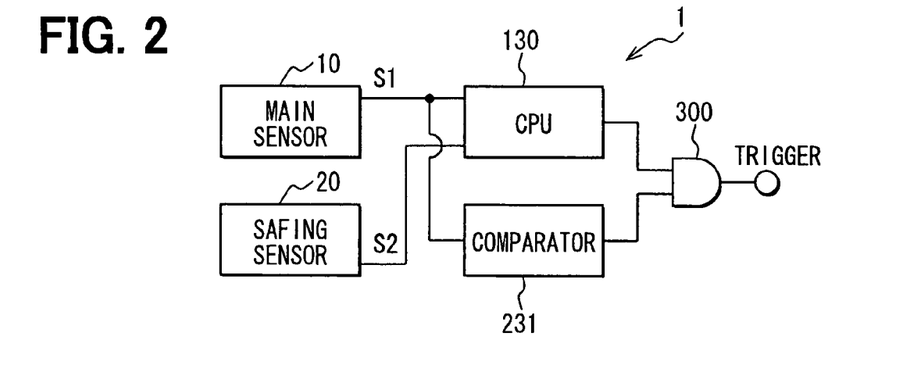
FIG. 2 is a simplified block diagram of the activation controller of FIG. 1.

As shown in FIG. 1, an activation controller 1 according to an embodiment of the present invention includes a main sensor 10 as a first sensor, a safing sensor 20 as a second sensor, a main control circuit 100, a sub control circuit 200, and a trigger signal output circuit 300. The activation controller 1 detects a side impact to a vehicle and outputs a trigger signal to a driver circuit 80 that activates an occupant protection device 90.

Figure 3:
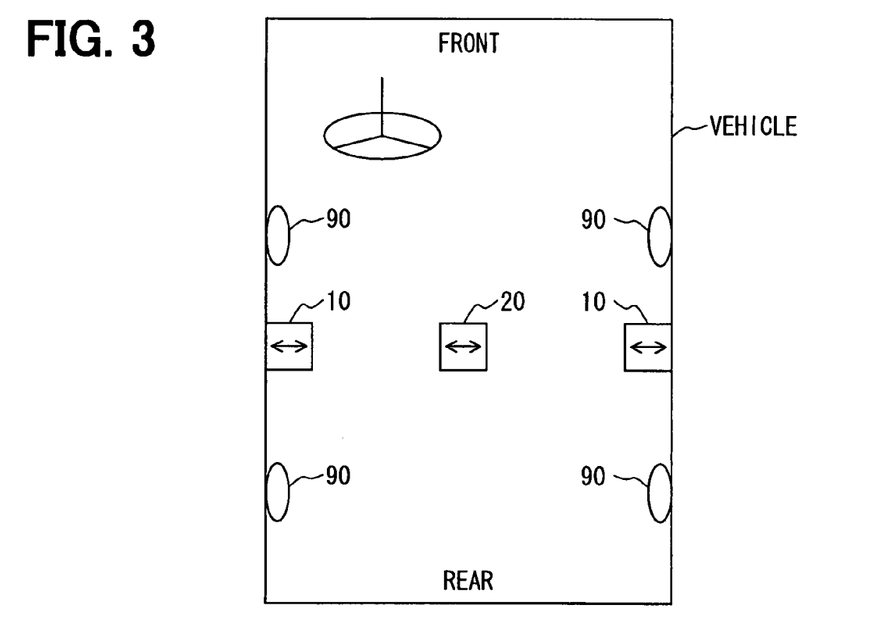
FIG. 3 is a diagram showing mounting locations of main and safing sensors of the activation controller of FIG. 1.

The main sensor 10 is an acceleration sensor and detects lateral deceleration (i.e., negative acceleration) of a vehicle. As shown in FIG. 3, the main sensor 10 is installed in the side portion of the vehicle. For example, the main sensor 10 is installed in a center pillar (i.e., B-pillar) or a door of the vehicle.

Likewise, the safing sensor 20 is an acceleration sensor and detects lateral deceleration of the vehicle. As shown in FIG. 3, the safing sensor 20 is installed approximately in the center of the vehicle.

Referring again to FIG. 1, the main control circuit 100 includes a first input/output (I/O) circuit 110, a second I/O circuit 120, a determination circuit 130, a read only memory (ROM) 140, a random access memory (RAM) 150, and an AND gate 160. Specifically, the main control circuit 100 except for the AND gate 160 is constructed as a microcomputer, and the determination circuit 130 is constructed as a central processing unit (CPU).

The determination circuit 130 includes a collision checker 131 as a first check circuit and a safing checker 132 as a second check circuit. Actually, the ROM 140 stores a program for causing the determination circuit 130 to serve as the collision checker 131 and the safing checker 132. The determination circuit 130 reads the program from the ROM 140 and executes the program on the RAM 150. As a result, the determination circuit 130 serves as the collision checker 131 and the safing checker 132.

The collision checker 131 receives a first output signal S1 from the main sensor 10 via the first I/O circuit 110. The collision checker 131 determines, based on the first output signal S1, whether to activate the occupant protection device 90. Specifically, the collision checker 131 compares the first output signal S1 with a first threshold voltage data Th1 stored in the ROM 140. If the first output signal S1 exceeds the first threshold voltage data Th1, the collision checker 131 determines that a first condition is met and outputs a first ON signal to the first I/O circuit 110.

The safing checker 132 receives a second output signal S2 from the safing sensor 20 via the second I/O circuit 120. The safing checker 132 determines, based on the second output signal S2, whether to activate the occupant protection device 90. Specifically, the safing checker 132 compares the second output signal S2 with a second threshold voltage data Th2 stored in the ROM 140. If the second output signal S2 exceeds the second threshold voltage data Th2, the safing checker 132 determines that a second condition is met and outputs a second ON signal to the second I/O circuit 120.

An output of the collision checker 131 is coupled to a first input of the AND gate 160 via the first I/O circuit 110. An output of the safing checker 132 is coupled to a second input of the AND gate 160 via the second I/O circuit 120. Upon receipt of both the first ON signal and the second ON signal, the AND gate 160 outputs a main control signal. In other words, when both the first condition and the second condition are met, the AND gate 160 outputs the main control signal.

Figure 4:
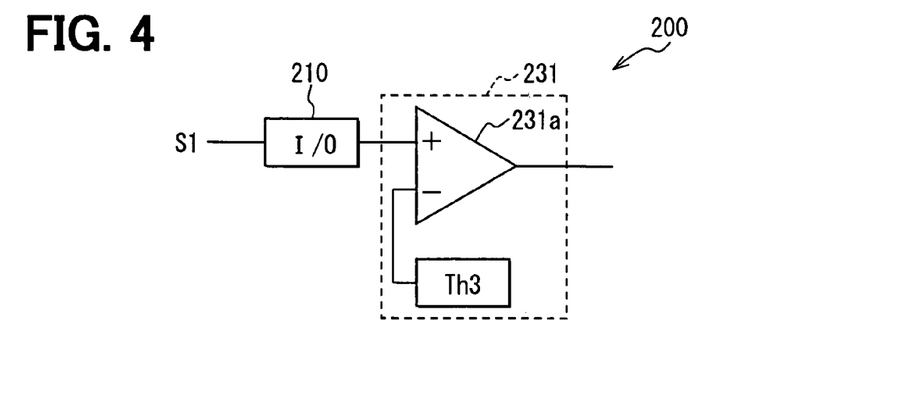
FIG. 4 is a circuit diagram of a sub controller of the activation circuit of FIG. 1.

As shown in FIG. 1, the sub control circuit 200 is constructed as an integrated circuit (IC) and includes a third I/O circuit 210 and a collision detector 231. The first output signal S1 outputted from the main sensor 10 is fed to the sub control circuit 200. As shown in detail in FIG. 4, the collision detector 231 has a comparator 231a. The collision detector 231 determines, based on the first output signal S1, whether the vehicle experiences a collision impact or the equivalent. Specifically, the first output signal S1 is applied to a non-inverting input of the comparator 231a, and a third threshold voltage data Th3 as a predetermined reference is applied to an inverting input of the comparator 231a. The comparator 231a compares the first output signal S1 with the third threshold voltage data Th3. If the first output signal S1 exceeds the third threshold voltage data Th3, the collision detector 231 determines that a third condition is met and outputs a sub control signal.

The trigger signal output circuit 300 has an AND gate. An output of the AND gate 160 of the main control circuit 100 is coupled to a first input of the AND gate of the trigger signal output circuit 300. An output of the collision detector 231 of the sub control circuit 200 is coupled to a second input of the AND gate of the trigger signal output circuit 300. Upon receipt of both the main control signal and the sub control signal, the trigger signal output circuit 300 outputs a trigger signal to the driver circuit 80. In other words, when all of the first condition, the second condition, and the third condition are met, the driver circuit 80 receives the trigger signal from the trigger signal output circuit 300.

The driver circuit 80 has a squib. Upon receipt of the trigger signal from the trigger signal output circuit 300, the driver circuit 80 activates the occupant protection device 90 by firing the squib with electric power from a battery or a backup power supply. For example, the occupant protection device 90 may be a side airbag installed in the door of the vehicle to protect an occupant from a side collision.

Figure 5A:
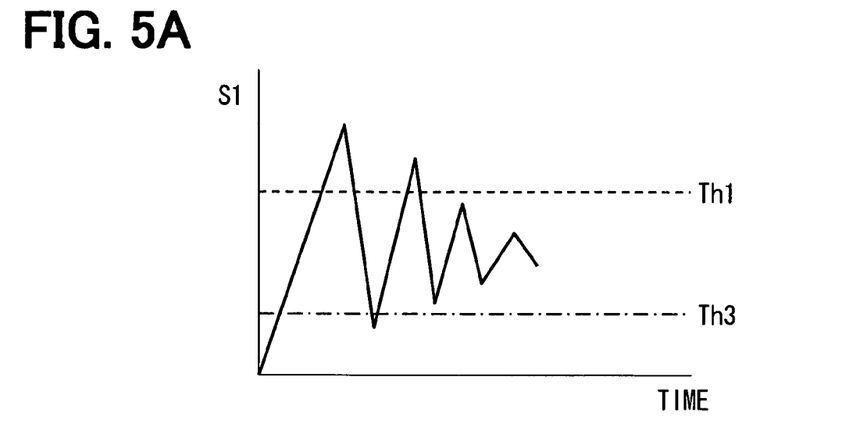
FIG. 5A is a graph showing a first output signal outputted from the main sensor when a vehicle collision occurs.
Figure 5B:
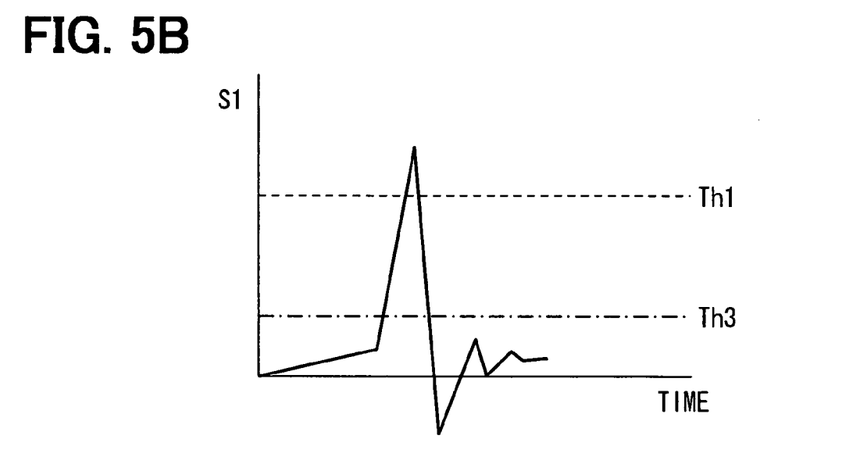
FIG. 5B is a graph showing the first output signal outputted when a vehicle door is closed.
Figure 5C:
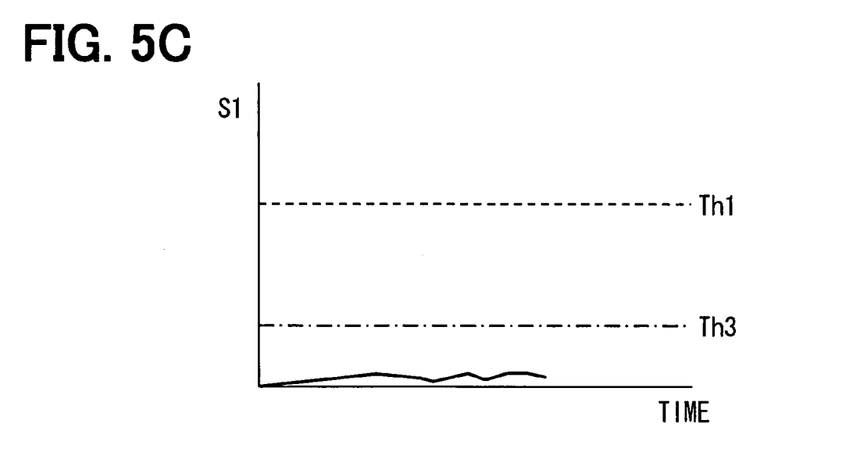
FIG. 5C is a graph showing the first output signal outputted under normal conditions.

FIGS. 5A-5C are graphs showing the first output signal S1 outputted from the main sensor 10. FIG. 5A represents the first output signal S1 outputted when the side collision occurs. FIG. 5B represents the first output signal S1 outputted when the door of the vehicle is closed. FIG. 5C represents the first output signal S1 outputted under normal conditions.

Figure 6A:
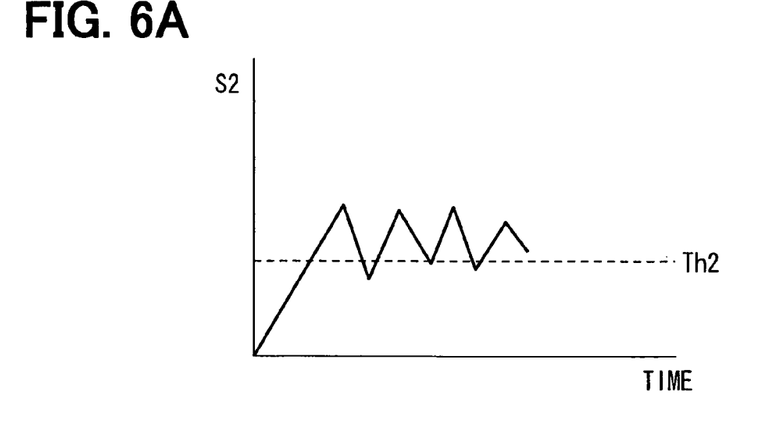
FIG. 6A is a graph showing a second output signal outputted from the safing sensor when the vehicle collision occurs.
Figure 6B:
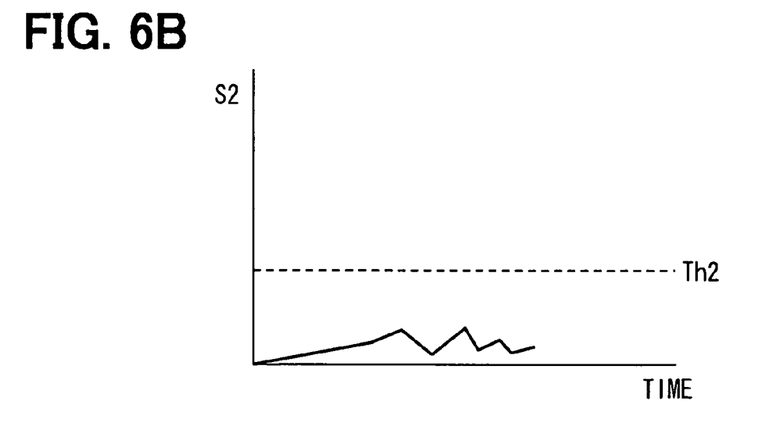
FIG. 6B is a graph showing the second output signal outputted when the vehicle door is closed.
Figure 6C:
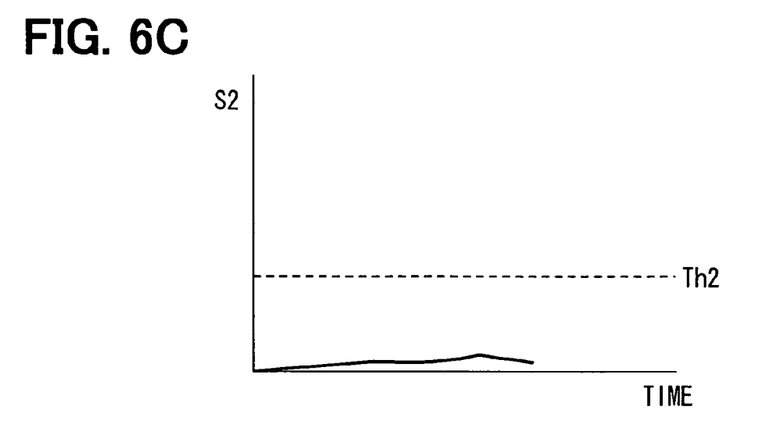
FIG. 6C is a graph showing the second output signal outputted under the normal conditions.

FIGS. 6A-6C are graphs showing the second output signal S2 outputted from the safing sensor 20. FIG. 6A represents the second output signal S2 outputted when the side collision occurs. FIG. 6B represents the second output signal S2 outputted when the door of the vehicle is closed. FIG. 6C represents the second output signal S2 outputted under normal conditions.

When the side collision occurs, the activation controller 1 works as follows: When the side of the vehicle is impacted by an object (e.g., another vehicle), the main sensor 10 detects the lateral deceleration of the vehicle and outputs the first output signal S1, indicative of the detected lateral deceleration, to the main control circuit 100. In the main control circuit 100, the collision checker 131 of the determination circuit 130 compares the first output signal S1 with the first threshold voltage data Th1. If the first output signal S1 exceeds the first threshold voltage data Th1, the collision checker 131 determines that the first condition is met and outputs the first ON signal. In the case of FIG. 5A, since the first output signal S1 exceeds the first threshold voltage data Th1, the collision checker 131 outputs the first ON signal.

When the side of the vehicle is impacted by the object, the safing sensor 20 also detects the lateral deceleration of the vehicle and outputs the second output signal S2, indicative of the detected lateral deceleration, to the main control circuit 100. In the main control circuit 100, the safing checker 132 of the determination circuit 130 compares the second output signal S2 with the second threshold voltage data Th2. If the second output signal S2 exceeds the second threshold voltage data Th2, the safing checker 132 determines that the second condition is met and outputs the second ON signal. In the case of FIG. 6A, since the second output signal S2 exceeds the second threshold voltage data Th2, the safing checker 132 outputs the second ON signal.

The first ON signal outputted from the collision checker 131 is fed to the first input of the AND gate 160 via the first I/O circuit 110. The second ON signal outputted from the safing checker 132 is fed to the second input of the AND gate 160 via the second I/O circuit 120. Upon receipt of both the first ON signal and the second ON signal, the AND gate 160 outputs the main control signal.

Further, as shown in FIG. 1, the first output signal S1 outputted from the main sensor 10 is also fed to the sub control circuit 200. In the sub control circuit 200, the comparator 231a of the collision detector 231 compares the first output signal S1 with the third threshold voltage data Th3. If the first output signal S1 exceeds the third threshold voltage data Th3, the collision detector 231 determines that the third condition is met and outputs the sub control signal. In the case of FIG. 5A, since the first output signal S1 exceeds the third threshold voltage data Th3, the collision detector 231 outputs the sub control signal.

The main control signal outputted from the main control circuit 100 is fed to the first input of the AND gate of the trigger signal output circuit 300. The sub control signal outputted from the sub control circuit 200 is fed to the second input of the AND gate of the trigger signal output circuit 300. Upon receipt of both the main control signal and the sub control signal, the trigger signal output circuit 300 outputs the trigger signal to the driver circuit 80. Upon receipt of the trigger signal from the trigger signal output circuit 300, the driver circuit 80 activates the occupant protection device 90 by firing the squib.

Thus, when the side collision occurs, the occupant protection device 90 is activated to protect the occupant from the side collision.

When the door of the vehicle is closed, the activation controller 1 works as follows: As described previously, the main sensor 10 is installed in the side portion of the vehicle, for example, in the center pillar or the door of the vehicle. Therefore, for example, if the door is closed with excessive force, the first output signal S1 outputted from the main sensor 10 may exceed the first threshold voltage data Th1, as shown in FIG. 5B. As a result, the collision checker 131 determines that the first condition is met and outputs the first ON signal, despite the fact that the side collision does not occur.

In contrast, as described previously, the safing sensor 20 is installed approximately in the center of the vehicle. Therefore, even if the side door is closed with the excessive force, the second output signal S2 outputted from the safing sensor 20 does not exceed the second threshold voltage data Th2, as shown in FIG. 6B. As a result, the safing checker 132 determines that the second condition is not met and does not output the second ON signal, in accordance with the fact that the side collision does not occur. Since the AND gate 160 does not receive the second ON signal, the main control circuit 100 does not output the main control signal to the trigger signal output circuit 300.

In the sub control circuit 200, as shown in FIG. 5B, the first output signal S1 exceeds the third threshold voltage data Th3. As a result, the collision detector 231 determines that the third condition is met so that the sub control circuit 200 outputs the sub control signal to the trigger signal output circuit 300. Since the trigger signal output circuit 300 does not receive the main control signal, the trigger signal output circuit 300 does not output the trigger signal to the driver circuit 80.

Thus, even when the door is closed with the excessive force, the occupant protection device 90 is not activated. In short, false activation of the occupant protection device 90 can be prevented.

Due to electrical noise or malfunction of the main sensor 10, the first output signal S1 outputted from the main sensor 10 may exceed the first threshold voltage data Th1 and the first ON signal may be sent to the AND gate 160. Even in such a case, the second ON signal is not sent to the AND gate 160, because the second output signal S2 outputted from the safing sensor 20 does not exceed the second threshold voltage data Th2. Thus, even when the electrical noise or malfunction of the main sensor 10 occurs, the false activation of the occupant protection device 90 can be prevented.

Due to malfunction of the determination circuit 130 of the main control circuit 100, the main control signal may be sent to the trigger signal output circuit 300, despite the fact that the first and second output signals S1, S2 do not exceed the first and second threshold voltage datas Th1, Th2, respectively. Even in such a case, the sub control signal is not sent to the trigger signal output circuit 300, because the first output signal S1 does not exceed the third threshold voltage data Th3. Thus, even when the malfunction of the determination circuit 130 occurs, the false activation of the occupant protection device 90 can be prevented.

As described above, according to the embodiment of the present invention, the main sensor 10 detects the lateral deceleration of the vehicle. Also, the safing sensor 20 detects the lateral deceleration of the vehicle, independently of the main sensor 10. In the main control circuit 100, the collision checker 131 determines whether the first condition is met, and the safing checker 132 determines whether the second condition is met. The main control circuit 100 is allowed to output the main control signal, only when both the first and second conditions are met. Therefore, even when the electrical noise or malfunction of the main sensor 10 occurs, the false activation of the occupant protection device 90 can be prevented by the safing sensor 20 and the safing checker 132. Thus, the safing sensor 20 and the safing checker 132 provide redundancy to the activation controller 1. In the sub control circuit 200, the collision detector 231 determines, based on the first output signal S1 outputted from the main sensor 10, whether the third condition is met. The sub control circuit 200 outputs the sub control signal, when the third condition is met.

The trigger signal output circuit 300 is allowed to output the trigger signal, only when the trigger signal output circuit 300 receives both the main and sub control signals. In other words, the trigger signal output circuit 300 is allowed to output the trigger signal, only when all the first, second, and third conditions are met. Therefore, even when the main control signal is accidentally outputted from the main control circuit 100 due to the malfunction of the main control circuit 100, the false activation of the occupant protection device 90 can be prevented by the sub control circuit 200. Thus, the sub control circuit 200 provides additional redundancy to the activation controller 1. In such an approach, the activation controller 1 is configured in a redundant manner to ensure a reliable, fail-safe operation.

The sub control circuit 200 outputs the sub control signal based on the comparison between the first output signal S1 and the third threshold voltage data Th3. In short, the sub control circuit 200 is required to only compare the first output signal S1 with the third threshold voltage data Th3. Therefore, the sub control circuit 200 can be simplified and manufactured at low cost. Accordingly, the activation controller 1 can be manufactured at low cost.

The collision checker 131 and the safing checker 132 of the main control circuit 100 are achieved by a CPU. Therefore, the main control circuit 100 can determine whether the first and second conditions are met at high speed. Further, the first and second conditions can be adjusted by changing the first and second threshold voltage data Th1, Th2 stored in the ROM 140. Thus, the activation controller 1 can be easily customized according to vehicles.

The third threshold voltage data Th3 used in the sub control circuit 200 is set lower than the first threshold voltage data Th1. In such an approach, the sub control circuit 200 can be shared between different types of vehicles. In short, the sub control circuit 200 can be common parts of vehicles.

(Modifications)

The embodiment described above may be modified in various ways. For example, the occupant protection device 90 may be a front airbag to protect an occupant from a frontal collision. In this case, each of the main sensor 10 and the safing sensor 20 detects longitudinal deceleration of the vehicle. Alternatively, the occupant protection device 90 may be a side curtain airbag or a seat-belt pretensioner to protect an occupant from a rollover event. In this case, each of the main sensor 10 and the safing sensor 20 detects a roll angle of the vehicle.

The side collision of the vehicle may be detected by sensors other than acceleration sensors. For example, the main sensor 10 may be a pressure sensor installed inside the door to detect a pressure change due to the side collision.

Such changes and modifications are to be understood as being within the scope of the present invention as defined by the appended claims.

What is claimed is:

1. A controller that controls activation of an occupant protection device for a vehicle, the controller comprising:
   a first sensor that detects a movement of the vehicle and outputs a first signal indicative of the movement of the vehicle;
   a second sensor operable independently of the first sensor, the second sensor detecting the movement of the vehicle and outputting a second signal indicative of the movement of the vehicle;
   a main control circuit including a central processing unit that has a first check circuit for determining based on the first signal whether a first condition is met and a second check circuit for determining based on the second signal whether a second condition is met, the main control circuit outputting a main control signal when both the first condition and the second condition are met;
   a sub control circuit including a comparator that compares the first signal with a first threshold value, the sub control circuit outputting a sub control signal based on a result of the comparison; and
   a trigger signal output circuit that outputs a trigger signal for activating the occupant protection device upon receipt of both the main control signal and the sub control signal.

2. The controller according to claim 1, wherein
the first check circuit in the main control circuit compares the first signal with a second threshold value greater than the first threshold value, and determines that the first condition is met when the first signal exceeds the second threshold value, and
the sub control circuit outputs the sub control signal when the first signal exceeds the first threshold value.

3. The controller according to claim 2, wherein
the second check circuit in the main control circuit compares the second signal with a third threshold value different from the second threshold value, and determines that the second condition is met when the second signal exceeds the third threshold value.

4. The controller according to claim 1, wherein the movement of the vehicle is caused by a collision of the vehicle.

5. The controller according to claim 1, wherein the movement of the vehicle is caused by a rollover of the vehicle.

6. The controller according to claim 1, wherein the sub control circuit has no central processing unit.

7. A controller that controls activation of an occupant protection device for a vehicle, the controller comprising:
   a first sensor that detects a movement of the vehicle and outputs a first signal indicative of the movement of the vehicle;
   a second sensor operable independently of the first sensor, the second sensor detecting the movement of the vehicle and outputting a second signal indicative of the movement of the vehicle;
   a central processing unit coupled to each of the first sensor and the second sensor, the central processing unit determining based on both the first signal and the second signal whether a predetermined condition is met, and outputting a main control signal when the condition is met;
   a comparator that is coupled to the first sensor and compares the first signal with a first threshold value, the comparator outputting a sub control signal based on a result of the comparison; and
   a trigger signal output circuit that is coupled to each of the central processing unit and the comparator, and outputs a trigger signal for activating the occupant protection device upon receipt of both the main control signal and the sub control signal, wherein
   the comparator is disconnected from the second sensor, and
   the sub control signal is independent of the second signal.

8. The controller according to claim 7, wherein
the central processing unit has a first check circuit for determining based on the first signal whether a first condition is met and a second check circuit for determining based on the second signal whether a second condition is met, the central processing unit outputting the main control signal when both the first condition and the second condition are met.

9. The controller according to claim 8, wherein
the first check circuit compares the first signal with a second threshold value greater than the first threshold value, and determines that the first condition is met when the first signal exceeds the second threshold value, and
the sub control circuit outputs the sub control signal when the first signal exceeds the first threshold value.

10. The controller according to claim 8, wherein
the second check circuit compares the second signal with a third threshold value different from the second threshold value, and determines that the second condition is met when the second signal exceeds the third threshold value.

11. The controller according to claim 7, wherein the movement of the vehicle is caused by a collision of the vehicle.

12. The controller according to claim 7, wherein the movement of the vehicle is caused by a rollover of the vehicle.

13. The controller according to claim 7, wherein the comparator is an operational amplifier.

14. A controller that controls activation of an occupant protection device for a vehicle, the controller comprising:
   a first sensor that detects a movement of the vehicle and outputs a first signal indicative of the movement of the vehicle;
   a second sensor operable independently of the first sensor, the second sensor detecting the movement of the vehicle and outputting a second signal indicative of the movement of the vehicle;
   a main control circuit including a central processing unit that has a first check circuit for determining based on the first signal whether a first condition is met and a second check circuit for determining based on the second signal whether a second condition is met, the main control circuit outputting a main control signal when both the first condition and the second condition are met;
   a sub control circuit including a comparator that compares the first signal with a first threshold value, the sub control circuit outputting a sub control signal based on a result of the comparison; and
   a trigger signal output circuit that outputs a trigger signal for activating the occupant protection device upon receipt of both the main control signal and the sub control signal, wherein
   the comparator is disconnected from the second sensor, and
   the sub control signal is independent of the second signal.

15. The controller according to claim 14, wherein
   the first check circuit in the main control circuit compares the first signal with a second threshold value greater than the first threshold value, and determines that the first condition is met when the first signal exceeds the second threshold value, and
   the sub control circuit outputs the sub control signal when the first signal exceeds the first threshold value.

16. The controller according to claim 15, wherein
   the second check circuit in the main control circuit compares the second signal with a third threshold value different from the second threshold value, and determines that the second condition is met when the second signal exceeds the third threshold value.

17. The controller according to claim 14, wherein the movement of the vehicle is caused by a collision of the vehicle.

18. The controller according to claim 14, wherein the movement of the vehicle is caused by a rollover of the vehicle.

19. The controller according to claim 14, wherein the sub control circuit has no central processing unit.

20. The controller according to claim 14, wherein the comparator is an operational amplifier.

* * * * *